Patented May 28, 1940

2,202,108

UNITED STATES PATENT OFFICE 2,202,108

REFRACTORY METAL COMPOSITION

Clemens A. Laise, Tenafly, N. J.; Fidelity Union Trust Company and Rudolf Sievert, executors of said Clemens A. Laise, deceased No Drawing. Application July 13, 1937, Serial No. 153,357

6 Claims. (Cl. 176—132)

This invention relates to new and useful improvements in refractory metal compositions and its purpose is to produce a composition which does not unduly disintegrate when subjected to high temperatures or to electronic bombardment.

The composition forming the object of the present invention is particularly suitable for use in the form of sheets, discs or rods as X-ray targets and electrical make-and-break contacts, and in the form of fine wire as filaments for incandescent lamps, and particularly concentrated lamp filaments operated at high efficiency and high temperature.

My new refractory composition has a very high melting point and, owing to the presence of small percentages of such elements as vanadium, silicon and rhenium, its vaporization point is relatively high. A filamentary body produced from this composition will have a higher resistance than the customary tungsten filaments, and concentrated coil filaments, particularly when subjected to my special heat treatment, will have little tendency to sag and will hold their form without distortion at a higher vaporization point than the usual tungsten filament. This is especially true when the filament is shaped into dual or triple coils, as described in my application Serial No. 113,300 of November 30, 1936.

The substances which according to my invention are added to the tungsten base produce an alloy which, when subjected to my special heat treatment, produces a composition having large interlocking grains probably bonded by an intergranular cement of the alloy constituents and tungsten bronzes. Contacts made of large grain structure will have little tendency to disintegrate, and coiled incandescent lamp filaments and the like will neither become distorted nor vaporized when operated at high temperatures.

In the production of my refractory compositions I first produce a tungsten mixed with rhenium, having added thereto a small percentage of potassium tungstate and a small percentage of vanadium. The last two tend to direct the growth of crystals in a longitudinal direction so as to produce large interlocking grains and the vanadium tends to toughen the composition and makes it less sagging at high temperatures.

According to my invention, a homogeneous and uniformly coherent and adherent alloy of the above composition is produced which, after being mechanically worked and heat-treated, becomes a hard metallic refractory product suitable for contacts, electrodes, incandescent lamp filaments and the like.

In the manufacture of my novel composition, as the first step I produce purified tungsten oxide by the processes well known in the art and slurry into the same, after the tungsten oxide is precipitated and washed, a solution of potassium tungstate and sodium vanadate. A solution of ammonium vanadate or other alkaline vanadate, such as potassium or lithium vanadate, may also be used. These are incorporated into the oxide of tungsten in the proportion of not in excess of one gram of potassium tungstate and two grams of alkaline vanadate to 100 grams of tungsten oxide. My preferred proportions are about .5% $K_2WO_4$ and .5% sodium vanadate. The alkaline tungstates and vanadates are preferably dissolved in distilled water and then uniformly slurried into the oxide. The mixture is then evaporated and dried out until a yellow powder is obtained.

Simultaneously I may incorporate into the above mixture a solution of a soluble rhenium salt sufficient to obtain from 1% to 10% metallic rhenium in the final powder after reduction. However, my preferred method is to incorporate finely divided metallic rhenium powder into the above composition after the tungsten oxide is reduced to metal.

The reduction of the above powders may be carried out by the well known processes known in the art, especially with hydrogen gas and preferably in electric furnaces. My preferred method when producing metal for filament purposes is to resort to a two-stage reduction. In the first stage the powders are reduced to a brown oxide or to brown oxide with a slight layer of gray metal on the surface, and in the second stage this brown oxide is mixed with a like amount of the original oxide and the two ball-milled until uniform and homogeneous, and then reduced in hydrogen to a gray metallic powder. The first reduction is carried out at 500° to 700° C. and the second reduction at 700° to 950° with dry hydrogen continuously flowing through the furnace.

In my preferred alloying process I take the above reduced powder without rhenium and add to the metal composition from 2% to 10% metallic rhenium. My preferred composition contains about 2½% rhenium. The powders are thoroughly mixed and may be ball-milled up to fifty hours, so that each particle of the above metal powder is thoroughly coated with a fine film of rhenium powder. After a thoroughly uniform and homogeneous alloy mixture is obtained, the powders may be compressed into ingots and metallized, as is well known in the tungsten art. I prefer, however, to treat the ball-milled mixtures again in hydrogen at a temperature of about 500° C. for one hour, and at 600° C. to 900° C. for two hours, after which the powders are sieved through a 200-mesh sieve and are then ready for pressing.

The powders may then be pressed into slugs of any suitable size, depending upon their use, and are baked to make them suitable for handling at about 200° C. to 900° C. in an atmosphere of hydrogen.

They are then heat-treated or metallized by sending a current through the slugs equal to 87% to 93% of the current necessary to cause the slugs to fuse, the heating current depending upon the use to which the ingot is to be put and upon the grain count desired. For incandescent lamp filaments I may produce an ingot having a grain count of 12,000 to 17,000 grains per square millimeter. For certain types of contacts I may produce a slug with a grain count less than 5,000 grains per square millimeter.

The slugs are mechanically worked into rods, sheets or wire by processes well known in the art and preferably with intermediate annealing. For contacts of large grain count I heat-treat the rod just before finishing at a white heat in hydrogen or reducing gas just below its fusing point for a period of from two minutes to fifteen minutes, depending upon the size of grain desired. This will cause the grains to coalesce into a single crystal type structure.

If an exceptionally good non-sag filament is desired, as is the case of concentrated filaments of the coiled coil or triple coil type, my alloy wire is subjected to a few intermediate annealings, especially at .007" diameter, at white heat in hydrogen to break up its fibrous structure and impart a large grain growth to the wire.

If this wire is used for concentrated filaments it is finally, after concentrating, subjected to a final heat treatment at high incandescence either in the coil form or in the coil form after same is mounted on a stem or after the stem is sealed in and made into a lamp, the high temperature treatment being such as to impart a permanent set to the filament and cause the growth of the crystals into large interlocking shapes which will not offset or droop and permit but little lumen drop during the life of the lamp.

My alloy is especially designed to produce a composition which is very tough, has a high vaporization point, will not readily disintegrate and is non-sagging and of long life when operated as contacts or as filament for concentrated incandescent lamps.

Wire drawn from ingots of my alloy composition has much higher resistance than substantially pure tungsten wire and retains its ductility much longer after burning in incandescent lamps. Lamps equipped with filaments of my alloy will withstand shock and will be suitable for train lighting, moving picture cameras and the like.

What is claimed is:

1. A composition of matter comprising an alloy of predominantly tungsten and a small percentage of rhenium and vanadium consisting of large interlocking grains bonded together with an intergranular cement, whereby the rate of disintegration and the rate of distortion are reduced to a minimum.

2. As a new article of manufacture, an alloy of more than 90% tungsten, less than 10% rhenium, and not more than one-half of one per centum vanadium.

3. An incandescent metallic filament composed of an alloy of predominantly tungsten and a small percentage of rhenium and vanadium.

4. A filament for incandescent lamps comprising a closely wound concentrated coil that is non-sagging at its operating temperatures, consisting of an alloy of predominantly tungsten and a small percentage of rhenium and vanadium.

5. A metallic filament for incandescent lamps comprising long interlocking grains bonded by an intergranular cement of tungsten bronzes and consisting of an alloy of predominantly tungsten and a small percentage of rhenium and vanadium.

6. A metallic filament for incandescent lamps comprising long interlocking grains bonded by an intergranular cement of tungsten bronzes and consisting of an alloy of more than 90% tungsten, less than 10% rhenium and not more than one per centum vanadium.

CLEMENS A. LAISE.